(12) United States Patent
Lien

(10) Patent No.: US 6,264,576 B1
(45) Date of Patent: Jul. 24, 2001

(54) BICYCLE REAR DERAILLEUR SHIFTING CONTROLLER

(76) Inventor: Kuo-Cheng Lien, 5F-23, 70, Fu-Shing Road, Taoyuan (TW)

(*) Notice: Subject to any disclaimer, the term of this patent is extended or adjusted under 35 U.S.C. 154(b) by 0 days.

(21) Appl. No.: 09/299,993

(22) Filed: Apr. 27, 1999

(51) Int. Cl.[7] ................ F16H 9/00; F16H 7/22
(52) U.S. Cl. .............. 474/80; 474/127; 474/128; 74/489; 74/502.2
(58) Field of Search .................. 74/489, 502.2; 474/69, 70, 78, 80, 81, 82, 101, 122, 127, 128, 129

(56) References Cited

U.S. PATENT DOCUMENTS

| | | | |
|---|---|---|---|
| 5,618,241 | * | 4/1997 | Ose .................. 474/127 |
| 5,728,018 | * | 3/1998 | Terada et al. ........... 474/128 |
| 5,921,140 | * | 7/1999 | Lemmens .............. 474/128 |

* cited by examiner

Primary Examiner—David Fenstermacher
Assistant Examiner—Matthew A. Kaness

(57) ABSTRACT

A bicycle rear derailler shifting controller, which includes a base with a coupling tube, a rotary knob coupled to the coupling tube of the base, a cover plate fastened to the base to guide rotary motion of the rotary knob, and a derailler cable driven by the rotary knob to shift the rear derailler mechanism of the bicycle, wherein the coupling tube has a longitudinal sliding track and a cable hole; the derailler cable has one end inserted through the cable hole at the coupling tube and terminating in an endpiece, which is moved by the rotary knob along the longitudinal sliding track; the rotary knob has a sleeve coupled to the coupling tube of the base, the sleeve has an axial center hole, which receives the coupling tube, and a stepped guide flange inside the axial center hole, the stepped guide flange having radially extended straight edges and axially extended sloping edges alternatively arranged at one end adjacent to the base and moved with the rotary knob against the endpiece of the derailler cable to shift the rear derailler mechanism of the bicycle.

3 Claims, 4 Drawing Sheets

BICYCLE REAR DERAILLEUR SHIFTING CONTROLLER

BACKGROUND OF THE INVENTION

The present invention relates to a bicycle rear derailleur shifting controller, and more particularly to a simple structure of bicycle rear derailleur shifting controller which positively axially moves the derailleur cable to accurately shift the rear derailleur mechanism of the bicycle when rotated.

A regular bicycle rear derailleur shifting controller is generally comprised of a base and a rotary knob. The base comprises a coupling tube coupled to the handlebar of the bicycle. The rotary knob is fastened to an endpiece at one end of the derailleur cable, and rotatably coupled to the coupling tube of the base. Further, an arcuate spring member and a detent section are respectively provided at the base and the rotary knob. The arcuate spring member comprises an indexing projection shifted between notches at the detent section. The derailleur cable is driven to shift the rear derailleur mechanism of the bicycle upon rotary motion of the rotary knob. This structure of bicycle rear derailleur shifting controller is not satisfactory in function. Because the derailleur cable is wound round the coupling tube of the base and turned radially with the rotary knob around the coupling tube, it tends to be hindered by internal structure of the base, causing the rear derailleur mechanism shifting operated unable to be accurately achieved.

SUMMARY OF THE INVENTION

The present invention has been accomplished to provide a bicycle rear derailleur shifting controller which eliminates the aforesaid problem. According to one aspect of the present invention, the bicycle rear derailleur shifting controller comprises a base with a coupling tube, a rotary knob coupled to the coupling tube of the base, a cover plate fastened to the base to guide rotary motion of the rotary knob, and a derailleur cable driven by the rotary knob to shift the rear derailleur mechanism of the bicycle, wherein the coupling tube has a longitudinal sliding track and a cable hole; the derailleur cable has one end inserted through the cable hole at the coupling tube and terminating in an endpiece, which is moved by the rotary knob along the longitudinal sliding track; the rotary knob comprises a sleeve coupled to the coupling tube of the base, the sleeve defining an axial center hole, which receives the coupling tube, and a stepped guide flange inside the axial center hole, the stepped guide flange having radially extended straight edges and axially extended sloping edges alternatively arranged at one end adjacent to the base and moved with the rotary knob against the endpiece of the derailleur cable to shift the rear derailleur mechanism of the bicycle. According to another aspect of the present invention, the sleeve of the rotary knob comprises an outside annular flange having a plurality of endless grooves arranged in parallel around the periphery, and the cover plate comprises a plurality of projections raised from a smoothly curved side edge thereof and respectively inserted into the endless grooves at the outside annular flange of the rotary knob to guide rotary motion of the rotary knob on the coupling tube of the base.

DETAILED DESCRIPTION OF THE PREFERRED EMBODIMENT

Figure 1:
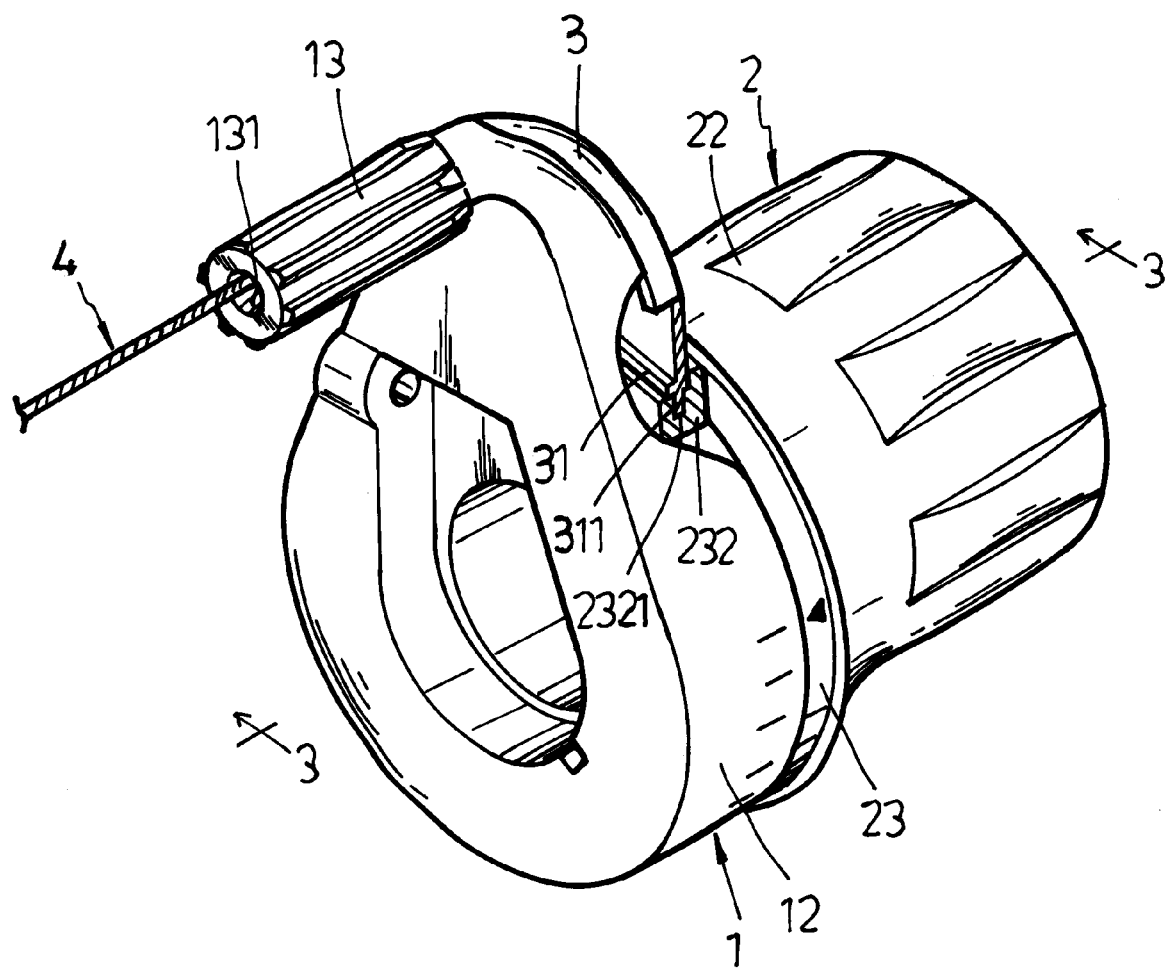
FIG. 1 is a perspective view of a bicycle rear derailleur shifting controller according to the present invention.

Referring to FIGS. from 1 through 3, a bicycle rear derailleur shifting controller in accordance with the present invention is shown comprised of a base 1, a rotary knob 2, a cover plate 3, and a derailleur cable 4.

The base 1 comprises a shell 12, a coupling tube 11, and a guide tube 13. The coupling tube 11 and the guide tube 13 are respectively formed integral with the shell 12 at two opposite sides at different elevations. The coupling tube 11 is provided for fastening to the bicycle's handlebar. The shell 12 comprises a chamber 121, a cable groove 122 extended in the chamber 121 between the guide tube 13 and the coupling tube 11, and a screw hole 123 in the chamber 121. The guide tube 13 defines an axial through hole 131, which communicates the cable groove 122 in the chamber 121. The coupling tube 11 comprises a longitudinal sliding track 111 at its peripheral wall, and a cable hole 112 at one end of the longitudinal sliding track 111 and in communication with the cable groove 122. The derailleur cable 4 has one end, namely, the lead end inserted through the axial through hole 131 in the guide tube 13, the cable groove 122 in the chamber 121 and the cable hole 112 at the coupling tube 11 and terminating in an endpiece 41, which is moved along the longitudinal sliding track 111.

Figure 2:
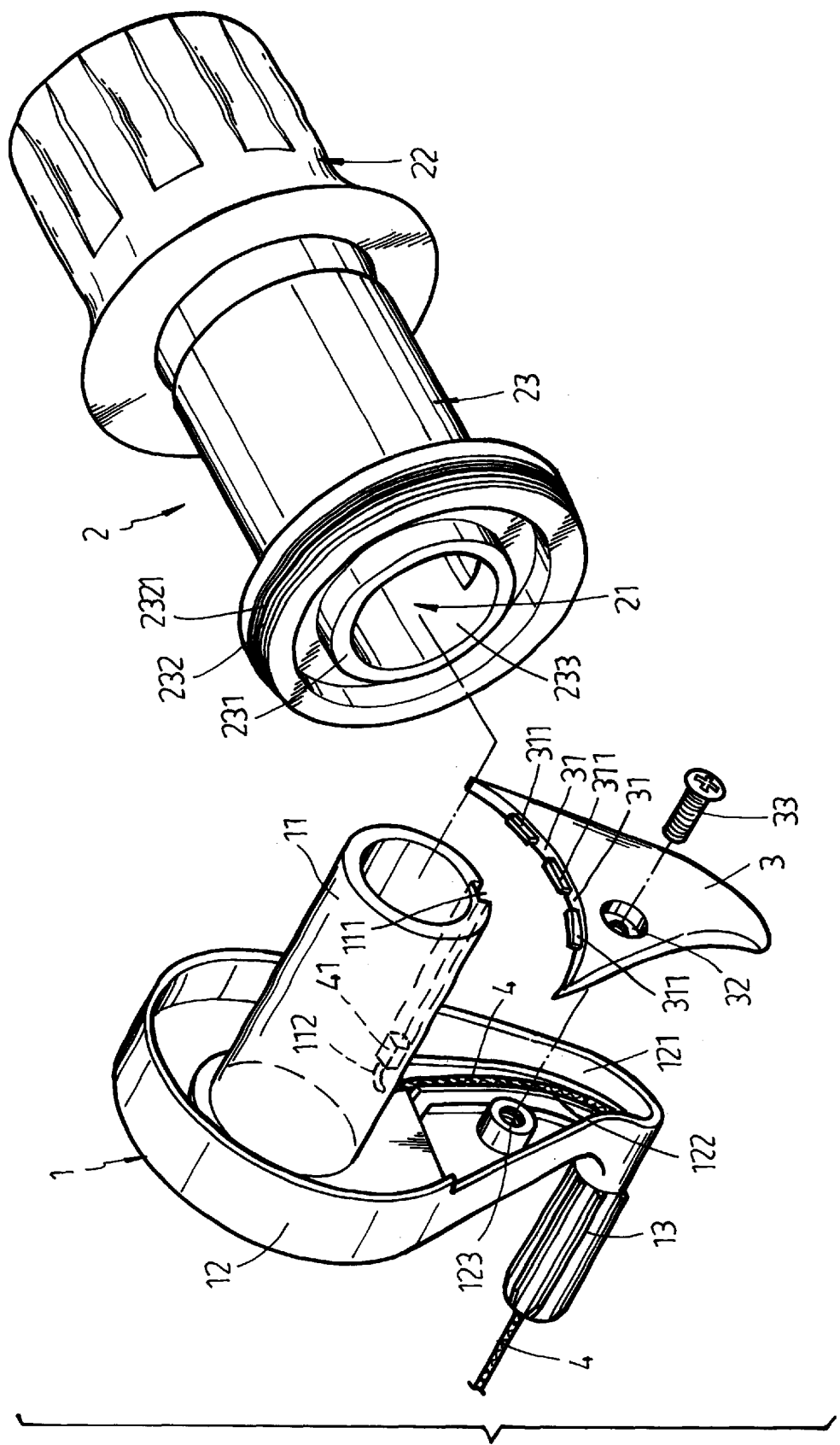
FIG. 2 is an exploded view of the bicycle rear derailleur shifting controller shown in FIG. 1.
Figure 3:
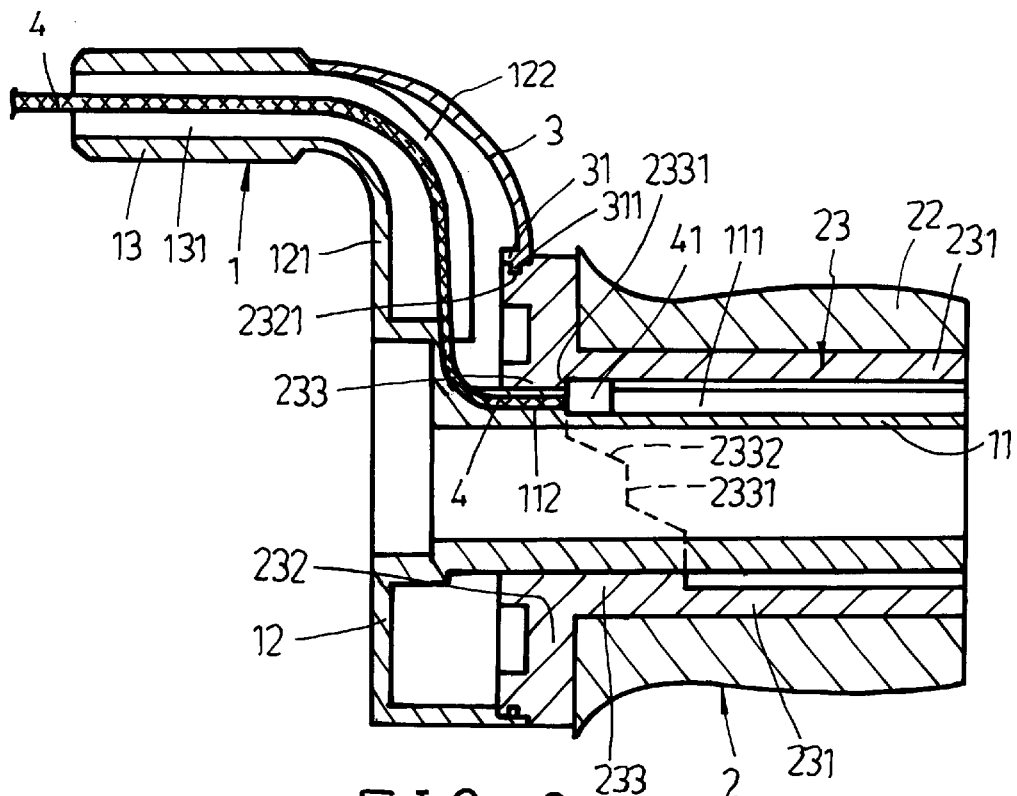
FIG. 3 is a sectional taken along line 3—3 of FIG. 1.
Figure 4:
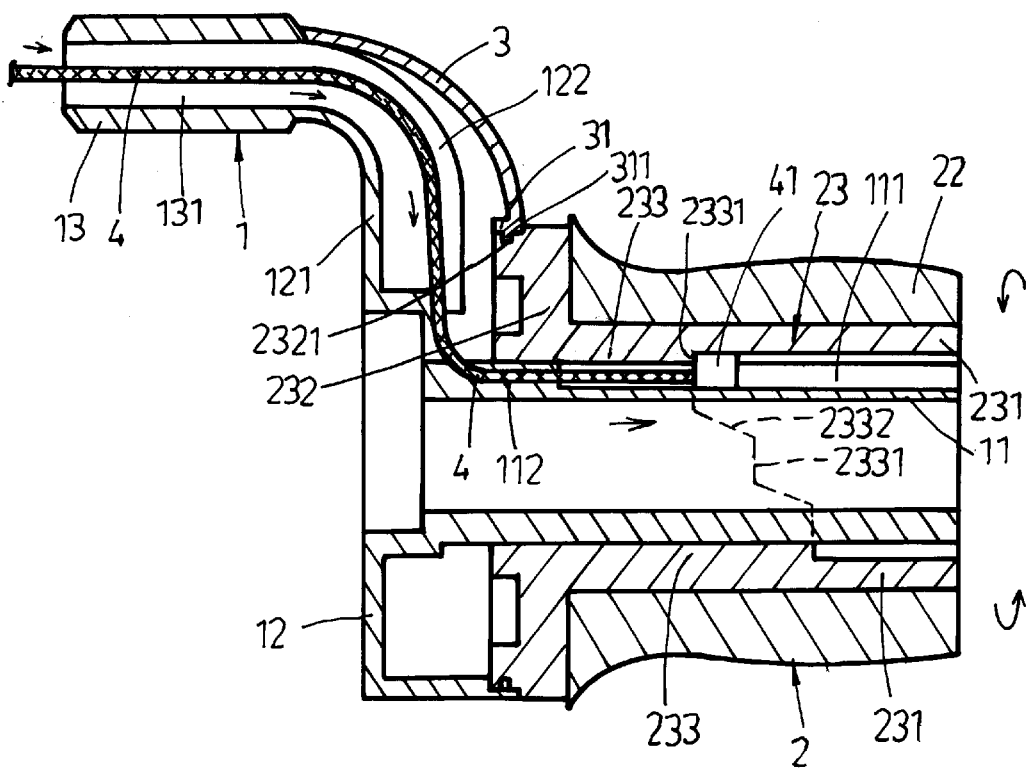
FIG. 4 is similar to FIG. 3 but showing the rotary knob rotated, the derailleur cable moved.
Figure 5:
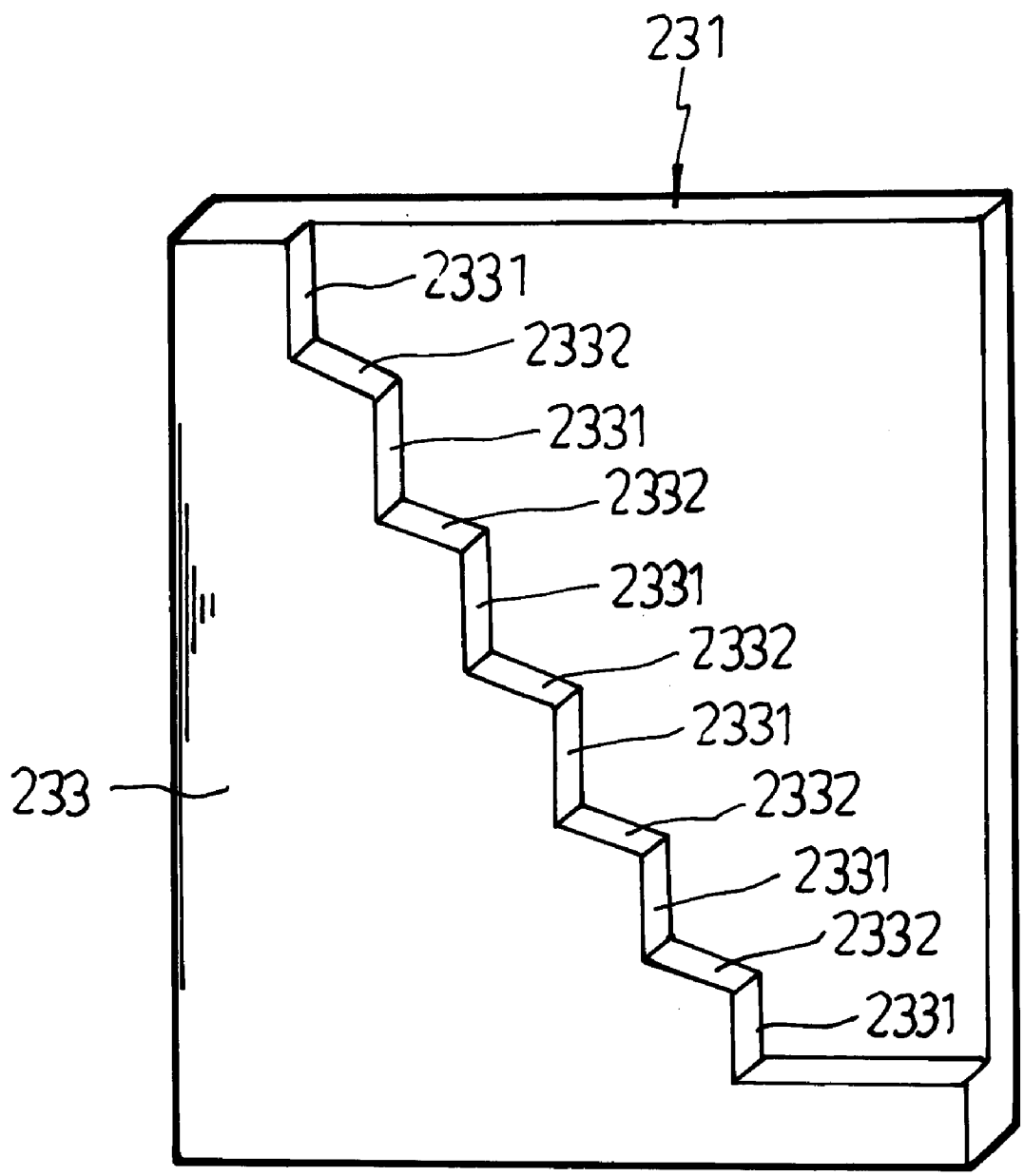
FIG. 5 is an extended-out view of the stepped guide flange of the sleeve of the body of the rotary knob according to the present invention.

Referring to FIG. 5 and FIGS. 2 and 3 again, the rotary knob 2 is coupled to the coupling tube 11 of the base 1, comprising a body 23 and a handgrip 22 formed integral with one end of the body 23 for operation by hand. The body 23 is comprised of a sleeve 231 and an outside annular flange 232 raised around the periphery of the sleeve 231 at one end remote from the handgrip 22. The sleeve 231 comprises an axial center hole 21, which receives the coupling tube 11, and a stepped guide flange 233 inside the axial center hole 21. The stepped guide flange 233 comprises radially extended straight edges 2331 and axially extended sloping edges 2332 alternatively arranged at one end adjacent to the base 1. The shortest one of the straight edges 2331 is stopped at one end of the endpiece 41 in the sliding track 111. The outside annular flange 232 comprises a plurality of endless grooves 2321 arranged in parallel at its peripheral wall. The cover plate 3 is covered on the chamber 121, comprising a countersunk hole 32 fastened to the screw hole 123 at the shell 12 by a screw 33, and a plurality of projections 311 raised from a smoothly curved side edge 31 thereof and respectively inserted into the endless grooves 2321 at the outside annular flange 232 of the body 23 of the rotary knob 2 to guide rotary motion of the rotary knob 2 on the coupling tube 11 of the base 1.

Referring to FIGS. from 3 through 5 again, when the body 23 is rotated with the handgrip 22 in one direction, the axially extended sloping edges 2332 are alternatively moved over the endpiece 41, causing the endpiece 41 to be relatively pushed inwards and stopped at one of the straight edges 2331. When the body 23 is rotated with the handgrip 22 in the reversed direction, the derailleur cable 4 is pulled by the spring member of the rear derailleur, enabling the endpiece 41 to be stopped at one of the straight edges 2331. Therefore, rotating the rotary knob 2 causes the derailleur cable 4 to be moved to shift the rear derailleur.

Referring to FIG. 1 again, an index 23 is marked at the outside annular flange 232 of the body 23 of the rotary knob 2, and aimed at graduations at the outside wall of the shell 12 to indicate the relative position of the rotary knob 2.

As indicated above, the rotary knob 2 is rotatably coupled to the base 1, and guided by the projections 311 of the cover plate 3 to move the derailleur cable 4 axially along the coupling tube 11 of the base 1 when rotated, causing the rear derailleur mechanism to be shifted relatively.

What the invention claimed is:

1. A bicycle rear derailleur shifting controller of the type comprising a base, said base comprising a shell, a coupling tube raised from shell at one side and fastened to the handlebar of the bicycle, and a guide tube raised from said shell at an opposite side, said shell comprising a chamber and a cable groove extended in said chamber between said guide tube and said coupling tube to guide said derailleur cable, a derailleur cable moved to shift the rear derailleur mechanism of the bicycle, a rotary knob coupled to said coupling tube and rotated to move said derailleur cable, said rotary knob comprising a body coupled to said coupling tube of said base and a handgrip formed integral with one end of said body, and a cover plate fastened to said shell and covered on said chamber to secure said rotary knob in place and to guide rotary motion of said rotary knob on said coupling tube, wherein:

said coupling tube comprises a longitudinal sliding track;

said derailleur cable has an endpiece at one end thereof moved along said longitudinal sliding track;

said body of said rotary knob comprising a sleeve and an outside annular flange raised around the periphery of said sleeve at one end remote from said handgrip, said sleeve comprising an axial center hole, which receives said coupling tube, and a stepped guide flange inside said axial center hole, said stepped guide flange comprising radially extended straight edges and axially extended sloping edges alternatively arranged at one end adjacent to said base and moved with said rotary knob to shift said derailleur cable.

2. The bicycle rear derailleur shifting controller of claim 1 wherein said coupling tube of said base comprises a cable hole disposed in communication with said cable groove for receiving said derailleur cable.

3. The bicycle rear derailleur shifting controller of claim 1 wherein said outside annular flange of said body of said rotary knob comprises a plurality of endless grooves arranged in parallel at the periphery thereof, and said cover plate comprises a plurality of projections raised from a smoothly curved side edge thereof and respectively inserted into the endless grooves at said outside annular flange of said body of said rotary knob to guide rotary motion of said rotary knob on said coupling tube of said base.

* * * * *